US008423947B2

(12) United States Patent
Lavin et al.

(10) Patent No.: US 8,423,947 B2
(45) Date of Patent: Apr. 16, 2013

(54) GRIDDED GLYPH GEOMETRIC OBJECTS (L3GO) DESIGN METHOD

(75) Inventors: Mark A. Lavin, Katonah, NY (US); Thomas Ludwig, Sindelfingen (DE); Gregory A. Northrop, Putnam Valley, NY (US); Robert T. Sayah, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1154 days.

(21) Appl. No.: 12/047,566

(22) Filed: Mar. 13, 2008

(65) Prior Publication Data

US 2009/0235215 A1    Sep. 17, 2009

(51) Int. Cl.
  *G06F 17/50* (2006.01)
(52) U.S. Cl.
  USPC ............ 716/136; 716/115; 716/119; 716/122
(58) Field of Classification Search ................ None
  See application file for complete search history.

(56) References Cited

U.S. PATENT DOCUMENTS

| 5,652,874 | A  | * | 7/1997  | Upson et al.   | 716/139 |
|-----------|----|---|---------|----------------|---------|
| 7,398,489 | B2 | * | 7/2008  | Dinter et al.  | 716/115 |
| 7,536,664 | B2 | * | 5/2009  | Cohn et al.    | 716/119 |
| 7,814,443 | B2 | * | 10/2010 | Finkler et al. | 716/100 |
| 7,900,178 | B2 | * | 3/2011  | Culp et al.    | 716/122 |
| 8,219,943 | B2 | * | 7/2012  | Cohn et al.    | 716/52  |
| 2006/0027919 | A1 | * | 2/2006 | Ali et al.    | 257/734 |
| 2006/0036977 | A1 | * | 2/2006 | Cohn et al.   | 716/4   |
| 2006/0080630 | A1 | * | 4/2006 | Lin           | 716/11  |

\* cited by examiner

*Primary Examiner* — Leigh Garbowski
(74) *Attorney, Agent, or Firm* — Law Offices of Charles W. Peterson, Jr.; Steven Capella, Esq.

(57) ABSTRACT

A method of gridded glyph geometric objects (L3GO) integrated circuit (IC) design, wherein at least one inter-level connect in a L3GO circuit design is represented as a point matrix glyph (PMG) on a L3GO grid. Each PMG connects a pair of conductors on the next adjacent (above and below) layer and includes an array (one or two dimensional) of point glyphs contained within a cage. The point glyphs may have uniform size and may be on minimum pitch. Each PMG may also include a flange on the above and below layer. A default flange insures adequate coverage of cut shapes represented by the point glyphs.

17 Claims, 3 Drawing Sheets

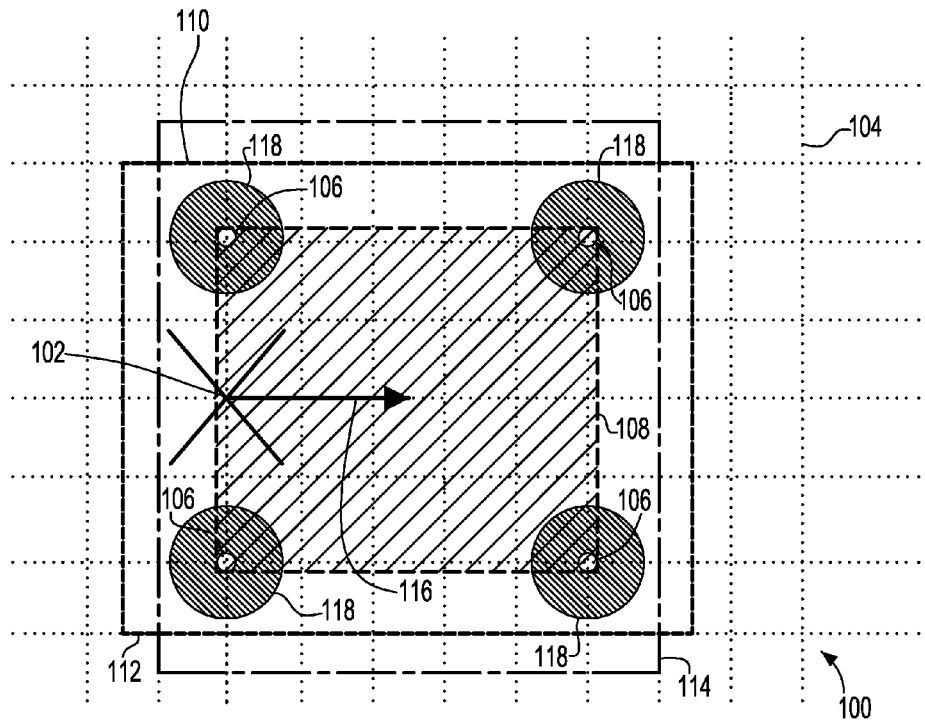

FIG. 1

| PARAMETER | RANGE | FUNCTION |
|---|---|---|
| LAYER | ca, v1, v2 ... | CUT LAYER (IMPLIES LAYER ABOVE AND LAYER BELOW) |
| nx | 1,2,3 | NUMBER OF POINTS IN x (PITCH SET BY TECHNOLOGY) |
| ny | 1,2,3 | NUMBER OF POINTS IN y (PITCH SET BY TECHNOLOGY) |
| ox | -N ... 0 ... +N | X OFFSET (INTEGER UNITS OF THE CUT LAYER GRID) |
| oy | -N ... 0 ... +N | Y OFFSET (INTEGER UNITS OF THE CUT LAYER GRID) |
| pm | LIST OF FLOAT NUMBERS | SPECIAL PITCH MULTIPLIER (APPLIED TO NORMAL PITCH) |
| om | -1.0 TO 1.0 (LIST) | SPECIAL OFFSET (RELATIVE TO SPECIAL PITCH) |
| pfa | DC, RIGHT WAY, WRONG WAY | PREFERRED EXTENSION DIRECTION (ABOVE) |
| pfb | DC, RIGHT WAY, WRONG WAY | PREFERRED EXTENSION DIRECTION (BELOW) |

FIG. 2

GRIDDED GLYPH GEOMETRIC OBJECTS (L3GO) DESIGN METHOD

CROSS REFERENCE TO RELATED APPLICATION

The present invention is related to published U.S. Pat. No. 7,536,664, "PHYSICAL DESIGN SYSTEM AND METHOD" to Cohn et al., published as US 2006/0036977 A1, filed Aug. 12, 2004 and published Feb. 16, 2006, and to U.S. Pat. No. 7,900,178, "INTEGRATED CIRCUIT (IC) DESIGN METHOD, SYSTEM AND PROGRAM PRODUCT" to Culp et al., filed Feb. 28, 2008, both assigned to the assignee of the present invention.

BACKGROUND OF THE INVENTION

1. Field of the Invention

The present invention is related to circuit design and more particularly to chip design systems and computer aided design (CAD) systems for designing printed circuits, integrated circuits (ICs) and IC chips.

2. Background Description

A typical integrated circuit (IC) chip includes a stack of several sequentially formed layers of shapes. Each layer is stacked or overlaid on a prior layer and patterned to form the shapes that define devices (e.g., field effect transistors (FETs)) and wires that connect the devices into circuits. Typical such connections are through vertical inter-level interconnects such as a device contact, e.g., to diffusion or a gate, or what is known as a via between wiring levels. Each of these layers of shapes, also known as mask levels or just levels, may be created or printed optically through well known photolithographic masking, photo-developing and level definition techniques, e.g., etching, implanting, deposition and etc. Ideally, fabrication parameters such as process biases, applied to features on a particular layer, affect all features on that layer uniformly. However, all features do not respond uniformly.

While ideally contacts and vias have zero resistance, each contact or via has an inherent resistance that is inversely proportional to contact/via size and what is referred to as the its leading edge. For a typical non-critical signal line driving a capacitive load (C), even several picofarads (pf), a contact/via that adds tens and perhaps hundreds of Ohms ($\Omega$) of contact resistance (R) to the signal path, adds delay (RC) to the path that may be neglectable. So typically, minimum dimension contacts and vias are used in non-critical signal paths. However, where relatively large currents flow through such a contact/via, this same contact resistance can cause relatively large voltage drops or voltage spikes (e.g., 20% of the supply voltage or more) that are very troublesome. The simplest way to reduce contact resistance is to make the contacts and vias larger. Unfortunately, different sized contact shapes and vias behave differently to focus and subsequent fabrication processing.

When small, minimum dimension shapes print and etch to form desired contacts or vias, large shapes for larger contacts tend to expand. The design shape washes out and, perhaps, encroaches on neighboring circuits or may at least be larger than the adjacent layer (above and below) shapes being connected, i.e., having inadequate coverage. Consequently, this encroachment may cause unwanted shorts to those neighboring circuits or wiring. By contrast, when the larger shapes are the target for printing and etching, the smaller, minimum dimension shapes may not open (i.e., contacts or vias may fail to form). Consequently, resulting circuits may have open signal lines. Either result is undesirable, causing chips to fail and reducing chip yield. Either of these results is undesirable and may cause failing chips, i.e., yield loss.

Typically, to avoid either extreme and the resulting yield loss, contacts and vias are constrained to a single size across an entire design. For example, contact/via shapes may be constrained all one, e.g., minimum dimension, with larger contacts/vias being replaced with an array of these smaller shapes on a minimum pitch.

U.S. Pat. No. 7,536,664, "Physical Design System And Method" to Cohn et al., teaches a circuit design format that is now known as gridded glyph geometric objects (L3GO) format. In particular, a L3GO layout is, essentially, an extension to a conventional design with few optional conventional shapes, but primarily much simpler L3GO-specific components, i.e., grids, glyphs and attributes, on a much more coarse grid. The grid is a regular rectangular array of points, all of which are subsets of a built-in manufacturing grid. Each glyph is specified with respect to the grid and assigned to a layer, e.g., by attributes. Also, attributes assigned to each glyph may carry arbitrary additional information including, for example, design intent, e.g., indicating that a polysilicon level glyph is in a timing-critical net.

Generally, typical L3GO layouts include three simple geometric types of primitives or glyphs, point glyphs (also referred to herein as points), stick glyphs (also referred to herein as sticks) and rectangle glyphs (also referred to herein as rectangles). Point glyphs are dimensionless or 0-dimensional points lying at grid points and are typically used for vertical interconnections, e.g., contacts and vias. Stick glyphs are 1-dimensional line segments drawn between two grid points. Typically, stick glyphs are used for FET gates or for interconnections. Rectangle glyphs are 2-dimensional, axis-aligned rectangles with vertices on grid points, typically used for diffusion regions. As with polygonal shapes in conventional layouts, each L3GO glyph resides on a particular design layer (e.g., POLY, DIFF), which indicates its function, wafer material and etc.

Unfortunately, using a point glyph alone (e.g., a point on a via layer) to represent vias, especially using multiple, redundant vias forming a single connection, has been ineffective in capturing design intent. Adding an array of point glyphs that may not allow a minimum pitch array has not proven effective either.

Thus, there is a need for design tools that efficiently locate arrays of contacts or vias in a typical circuit design.

SUMMARY OF THE INVENTION

It is a purpose of the invention to simplify circuit physical design;

It is yet another purpose of the invention to reduce the cost and risk of layout generation and layout checking of circuits with arrays of inter-level contacts at selected inter-level connections;

It is yet another purpose of the invention to improve the efficiency of layout data preparation in designs with arrays of inter-level contacts at selected inter-level connections;

It is yet another purpose of the invention to improve the efficiency of layouts including and in using arrays of inter-level contacts in gridded glyph geometric objects (L3GO) format designs.

The present invention relates to a method of gridded glyph geometric objects (L3GO) integrated circuit (IC) design, wherein at least one inter-level connect in a L3GO circuit design is represented as a point matrix glyph (PMG) on a L3GO grid. Each PMG connects a pair of conductors on the next adjacent (above and below) layer and includes an array (one or two dimensional) of point glyphs contained within a cage. The point glyphs may have uniform size and may be on minimum pitch. Each PMG may also include a flange on the above and below layer. A default flange insures adequate coverage of cut shapes represented by the point glyphs.

BRIEF DESCRIPTION OF THE DRAWINGS

The foregoing and other objects, aspects and advantages will be better understood from the following detailed description of a preferred embodiment of the invention with reference to the drawings, in which:

FIG. 1 shows a simple example of a point matrix glyph (PMG) located at a grid point origin in a gridded glyph geometric objects (L3GO) design, according to a preferred embodiment of the present invention;

FIG. 2 shows a table with an example of glyph attributes;

DESCRIPTION OF PREFERRED EMBODIMENTS

Figure 3A:
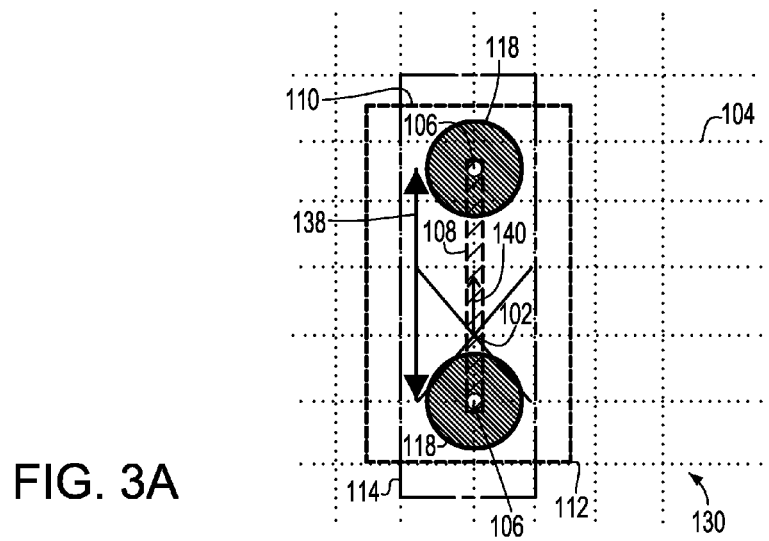
FIGS. 3A-B shows another example in an application of a one by two PMG connecting a pair of stick glyphs.

Turning now to the drawings and, more particularly, FIG. 1 shows a simple example of a point matrix glyph (PMG) 100 located at origin 102 on a grid point on a placement grid 104 in a gridded glyph geometric objects (L3GO) design, according to a preferred embodiment of the present invention. Preferably, a PMG 100 is a multi-layer cell-glyph that may be used to locate a via array connecting metal layers or a contact array, e.g., connecting metal to diffusion. In particular, PMGs 100 have application in circuit design, e.g., integrated circuit (IC) chip grid and glyph design, such as is described in U.S. Pat. No. 7,536,664, "Physical Design System And Method" to Cohn et al., assigned to the assignee of the present invention and incorporated herein by reference. A PMG 100 may be placed at an intersection of two stick glyphs to connect those two stick glyphs with an array of contacts/vias with the connection located for physical checking e.g., as described by Cohn et al., at the PMG origin 102.

Unlike simple glyphs taught by Cohn et al., a PMG 100 is a multi-layer cell-glyph, in this example, a discrete array of point glyphs 106 clustered in a matrix. A rectangle or cage 108 encloses or bounds the point glyph 106 matrix and identifies a nominal connecting conductor (e.g., metal, polysilicon and/or diffusion above and below) coverage area. The PMG 100 also includes a default flange 110 that defines conductor shapes on conducting layers above and below the point glyph 106 matrix layer. The default flange 110 is the minimum to provide adequate contact coverage. Also, optional biasing flanges 112, 114 are included for selectively extending coverage in one direction (e.g., the x direction) or the other (the y direction). The PMG 100 may be located at an offset from the origin 102 as indicated by offset vector 116. Although not part of the PMG 100, this example includes a physical design for a contact or via 118 shown with each of the point glyphs 106.

Each PMG 100 may be implemented as either a set or class of cells, a parameterized cell or a representation with a discrete set of allowed parameters. Further, the PMG cell 100 contains both graphical objects (point and cage glyphs) 106, 108 and attributes describing the PMG 100 configuration. After placing the PMG 100, L3GO ground rule checking may be done on the connection, e.g., as described in Cohn et al., to determine L3GO ground rule legality. Then, the design passes to elaboration, where appropriate elaboration (translation into manufacturable target shapes) is determine by L3GO elaboration, also as described in Cohn et al.

More particularly, the PMG origin 102 is constrained to be on the grid 104 and defined for the connection layer, e.g., contact (ca) layer, first via (v1) layer, second via (v2) layer. A PMG 100 is placed at a intersection of 2 stick glyphs on vertically adjacent conducting/conductor layers (diffusion, polysilicon or metal) to form a connection at the PMG origin 102. The point glyphs form a matrix in a 2 dimensional array (nx, ny) of point glyphs 106 with uniform spacing, each nominally representing a single contact or via (cut shape) 118. Each point glyph 106 is represented by a minimum size (for the particular design tool) circle centered at the glyph point. The actual cut shapes 118 are not constrained to be on the cut layer grid, only the PMG origin 102. Moreover, although the stick glyph intersection is located at the origin 102 of the PMG 100, the geometric center may displaced from the origin 102 by an offset (ox, oy) 116. The PMG cage 108 is the least enclosing rectangle of the matrix of individual point glyphs 106, and is the primary indicator of the spatial extent of the preferred PMG 100.

To insure adequate contact/via 118 coverage, shapes on both conductor layers, above and below, must extend beyond the cage by a sufficient amount, typically by a length/width that is technology dependent. So, the PMG 100 includes a default flange 110 that may be considered sufficient to provide adequate contact coverage. Normally, conductor layers are oriented in a single direction with adjacent conductor layers being oriented in orthogonal directions. Typically, when lines are printed, they foreshorten slightly. So, to compensate for this foreshortening, lines are slightly lengthened or extended beyond its termination point at contact/via.

This compensation may be accomplished by selecting optional biasing flanges 112, 114. These optional biasing flanges 112, 114 may be selected for each conductor layer (above and below layer) with additional PMG parameters/ attributes that indicate preferred metal coverage. This preferred metal coverage may be indicated as a "don't care" (no compensation) or relative to a preferred direction for the layer, e.g., extending the flange in or, orthogonal to, a preferred direction.

FIG. 2 shows an example of a glyph attribute table 120, listing glyph attributes and identifying particular PMG glyph parameters, a range or valid values for each parameter with a function for each. A layer parameter defines the cut shape layer (e.g., ca, v1 or v2). By identifying the particular contact or cut layer, the layers being connected (above and below the contact) are also defined. Point glyph matrix dimensions indicate the number of points in each (e.g., x and y) grid direction with default point glyph pitch set by the particular technology, which may or may not be directionally dependent. The PMG 100 offset is an integer in grid units, the minimum L3GO granularity, and is the offset between the PMG origin 102 and geometric center. Also, a pitch multiplier (pm) and pitch offset (om) allow for adjusting the point glyph matrix in one direction. In particular, for a non-default point glyph matrix that is are restricted in range, the pitch multiplier and offset are applied in only one direction and the offset in the other direction must be zero. A preferred extension (flange) direction may be selected for the flange in the layer above (pfa) and the layer below (pfb). So for each layer, the flange may be set to a: don't care (DC), right way (in the layer wiring direction) and wrong way (orthogonal to the layer wiring direction).

Figure 3B:
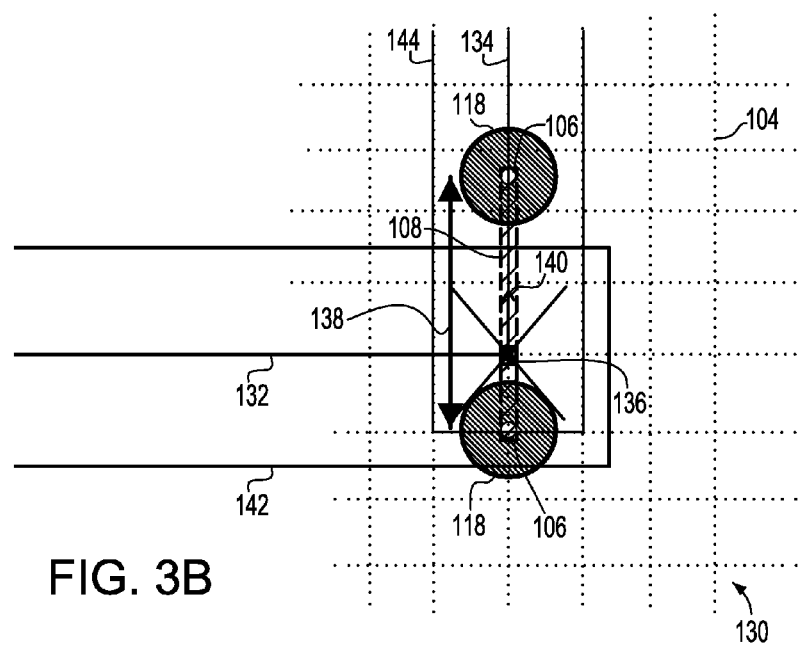

FIGS. 3A-B show another example of application of a one (nx=1) by two (ny=2) preferred PMG 130 connecting a pair of stick glyphs 132, 134, with like features labeled identically as FIG. 1. A connection shape 136 at the origin 102 facilitates design checking. Although the offset parameters (ox, oy) are zero in this example, a pitch multiplier (pm=0.8) 138 and pitch offset (om=0.5) 140 have been applied. As can be seen from this example, each preferred PMG addresses specific spacing needs for specific levels, e.g., adjacent wiring layers. The pair of stick glyphs 132, 134 represent wires 142, 144 and, for signal path/logic checking, are considered to connect at the connection shape 136 located at PMG origin 102. As can be seen from FIG. 3B, without the flanges 110, 112, 114 from FIG. 3A, the two wires 142, 144 may connect, but contact/via 118 coverage is clearly inadequate. Thus by both locating the origin on the intersection of the stick glyphs 132, 134 and including the flanges 110, 112 or 114 on the respective wiring layers with wires 142, 144, the wires 142, 144 connect and with adequate contact/via 118 coverage by design.

Figure 4:
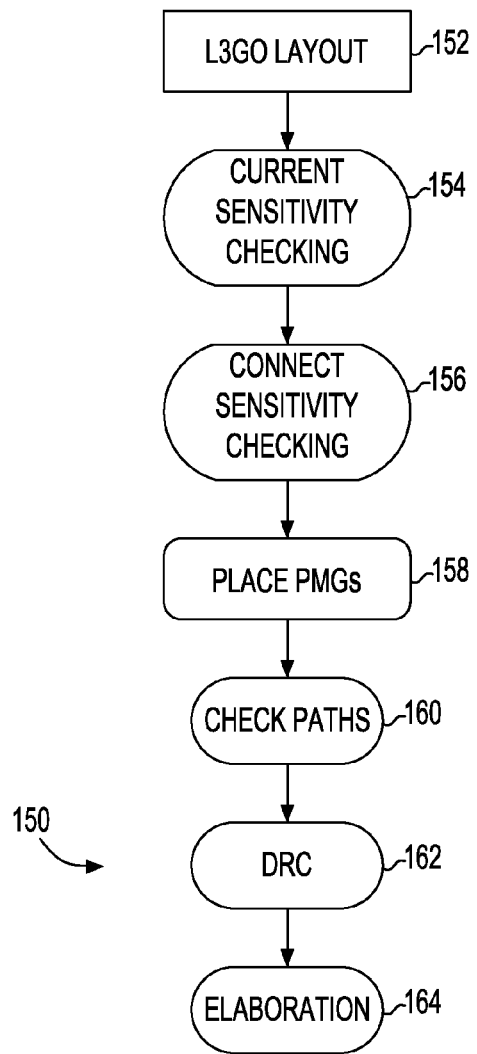
FIG. 4 shows an example of including PMGs in a L3GO design.

FIG. 4 shows an example 150 of including PMGs in a design according to a preferred embodiment of the present invention. First, in step 152 a L3GO circuit design is input. The L3GO circuit design includes at least one circuit represented as glyphs located on a grid. Inter-level transitions between two conductive levels (e.g., metal diffusion or polysilicon) are connected by inter-level connects such as contacts and vias that are represented as point glyphs with a selected uniform size, typically minimum size. In step 154 L3GO portions of the design may be checked for current sensitive nets, i.e., those nets that may encounter unacceptable voltage drops from voltage spikes or otherwise. For example, current sensitive nets may be identified as those nets where current through a minimum size contact is such that the voltage across the contact resistance may exceed a maximum accepted voltage. Next in step 156 current sensitive connects are identified in each current sensitive nets. Connects at the end of a net encounter much less current or much smaller current spikes than nets close to a source such as a driver. Then, in step 158 each identified current sensitive connect is replaced with a PMG. Optionally, contacts may be selected for replacement by design, e.g., manually. In step 160 signal paths are checked to insure connectivity, substantially as described in Cohn et al.

A design that includes one or more PMG is treated substantially the same as simpler primitive glyphs described in Cohn et al., except for PMG specific checking and in DRC 162 and elaboration 164. In particular, during DRC 162 each PMG is checked for legal placement and orientation. Also, each PMG is checked for legal overlap with geometric glyphs and other PMGs. Finally, during DRC 162 each PMG is checked for also is checked enough room for extensions (flanges) as well as for legal spacing to non-connected glyphs and PMGs.

During elaboration 164 each PMG is converted (with every simpler primitive glyphs) into mask target shapes. So with reference to FIGS. 3A-B, just as stick glyphs 132, 134 are converted to wires 142, 144, elaboration 164 converts the array/matrix of point glyphs 106 to a contact/via cut shapes 118. The cut shapes 118, normally square or rectangular shapes, may be moved/modified/mapped as long as the resulting targets correspond to the intended current capacity and resistance. Elaboration 164 also generates the flanges 110, 112, 114 biased according to PMG attributes to insure proper coverage at wiring layers below and above the contact/via cut shape 118 matrix and optimizes that coverage in the context of adjacent metal and vias.

Furthermore, the PMG attributes may include a relative priority so that optimizations may be adjusted, by design and individually on a per PMG (connection) basis. Also, coverage can be adjusted for specific design goals. For example, the metal extension over a clock via may be increased with respect to an adjacent signal via for improved parametric timing. Alternately, the PMG metal coverage may be set for one or more scan net to optimize defect limited yield, instead of for parametric performance.

Advantageously, contact/via arrays may be placed as (or large contacts may be replaced with) a simple glyph matrix or PMG in L3GO designs, to quickly and simply locate the contacts. PMGs and circuits including PMGs are easily and simply checked, both by using the PMG origin for logic checking and the bounding box or cage for design rule checking. A marker at the origin may be used in logic checking to detect line glyph connections for lines above and below each cut point. Also, contact coverage for such a preferred PMG array is correct by design as is contact spacing and spacing to adjacent features and structures. Further, PMGs are process independent allowing elaboration to re-map the cut matrix into alternative cut patterns. Each PMG may be expanded or shrunk, simply by increasing/decreasing matrix dimensions.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A method of gridded glyph geometric objects (L3GO) integrated circuit (IC) design comprising:
representing at least one inter-level connect in a circuit design as a point matrix glyph (PMG) on a L3GO grid, each said PMG being a multi-layer cell-glyph comprising an array of said point glyphs on an inter-level connect layer contained within a cage identifying a nominal connecting conductor coverage area, and at least one flange on each of a level above and below said array;
checking L3GO IC signal paths for connectivity;
checking said L3GO IC design for compliance with design rules; and
converting each said PMG to an array of inter-level connects between a pair of conductors.

2. A method of L3GO IC design as in claim 1, wherein said point glyphs in each said inter-level connect layer have a selected uniform size.

3. A method of L3GO IC design as in claim 2, wherein said at least one flange comprises a default flange and extension flanges, cut shapes represented by said point glyphs having a minimum acceptable coverage by said default flange.

4. A method of L3GO IC design as in claim 2, wherein at least one PMG includes a pitch multiplier and a pitch offset and representing further comprises applying said pitch multiplier and said pitch offset to said array.

5. A method of L3GO IC design as in claim 2, wherein representing further comprises locating the origin of said each PMG at a connection of conductors on said each level above and below said array.

6. A method of L3GO IC design as in claim 5, wherein checking L3GO IC signal paths comprises:
placing a marker at the origin of said each PMG; and
checking for connection between a stick glyph on each level above and below said array.

7. A method of L3GO IC design as in claim 5, wherein design rule checking comprises:
checking said each PMG for legal placement and orientation;

checking said each PMG for legal overlap with geometric glyphs and other PMGs; and checking said each PMG for legal spacing to non-connected glyphs and PMGs.

8. A method of L3GO IC design as in claim 7, wherein checking said each PMG for legal spacing comprises ensuring sufficient room for flange extensions.

9. A method of gridded glyph geometric objects (L3GO) integrated circuit (IC) design comprising:

inputting a circuit design, at least one circuit in said circuit design being represented as glyphs located on a grid in said L3GO format, inter-level connects being represented as point glyphs with a selected uniform size;

checking L3GO portions of said circuit design for current sensitive nets, current sensitive nets being nets having at least one inter-level transition, wherein net voltage from current through point glyph contact resistance exceeds a selected maximum voltage;

identifying current sensitive inter-level transitions in each identified inter-level connect; and replacing each identified current sensitive inter-level transition with a point matrix glyph (PMG), each said PMG being a multi-layer cell-glyph comprising an array of said point glyphs on one layer contained within a cage identifying a nominal connecting conductor coverage area, and at least one flange on each of a level above and below said array.

10. A method of L3GO IC design as in claim 9, wherein said at least one flange comprises extension flanges.

11. A method of L3GO IC design as in claim 9, wherein at least one PMG includes a pitch multiplier and a pitch offset.

12. A method of L3GO IC design as in claim 9, wherein the origin of said each PMG locates connection of conductors on said each level above and below said array.

13. A method of L3GO IC design as in claim 12, further comprising:

checking L3GO IC signal paths; and checking said L3GO IC design for compliance with design rules.

14. A method of L3GO IC design as in claim 13, wherein checking L3GO IC signal paths comprises:

placing a marker at the origin of said each PMG; and checking for connection between a stick glyph on each level above and below said array.

15. A method of L3GO IC design as in claim 13, wherein design rule checking comprises:

checking said each PMG for legal placement and orientation;

checking said each PMG for legal overlap with geometric glyphs and other PMGs; and checking said each PMG for legal spacing to non-connected glyphs and PMGs.

16. A method of L3GO IC design as in claim 15, wherein checking said each PMG for legal spacing comprises ensuring sufficient room for flange extensions.

17. A method of L3GO IC design as in claim 13, further comprising converting each said PMG to an array of inter-level connects between a pair of conductors.

* * * * *